United States Patent [19]
Matsuo et al.

[11] 3,721,409
[45] March 20, 1973

[54] CONTROLLED MULTI-STAGE DECREASING DRAG PARACHUTE

[75] Inventors: Jon T. Matsuo; Lawrence E. Neipling, both of El Centro, Calif.

[73] Assignee: The United States of America as represented by the Secretary of the Navy

[22] Filed: June 25, 1971

[21] Appl. No.: 156,750

[52] U.S. Cl. ................................................244/152
[51] Int. Cl. ............................................B64d 17/08
[58] Field of Search......244/152, 149, 145, 147, 142, 244/138

[56] References Cited

UNITED STATES PATENTS

| 2,970,795 | 2/1961 | Gold | 244/152 X |
| 2,371,898 | 3/1945 | Lisi | 244/152 |
| 2,308,797 | 1/1943 | Nasca | 244/142 |

FOREIGN PATENTS OR APPLICATIONS

| 717,633 | 2/1942 | Germany | 244/152 |
| 773,942 | 9/1934 | France | 244/152 |

Primary Examiner—Milton Buchler
Assistant Examiner—Carl A. Rutledge
Attorney—R. S. Sciascia et al.

[57] ABSTRACT

A controlled multi-stage decreasing drag parachute wherein the cloth portion of the canopy is provided with a centerline connecting the apex thereof to the load and one or more sets of suspension lines being connected at their upper ends to respective spaced points about the periphery and their lower ends slidably restrained around the centerline, the restraining means being releasable upon the application of a predetermined force to reduce the parachute drag area.

8 Claims, 4 Drawing Figures

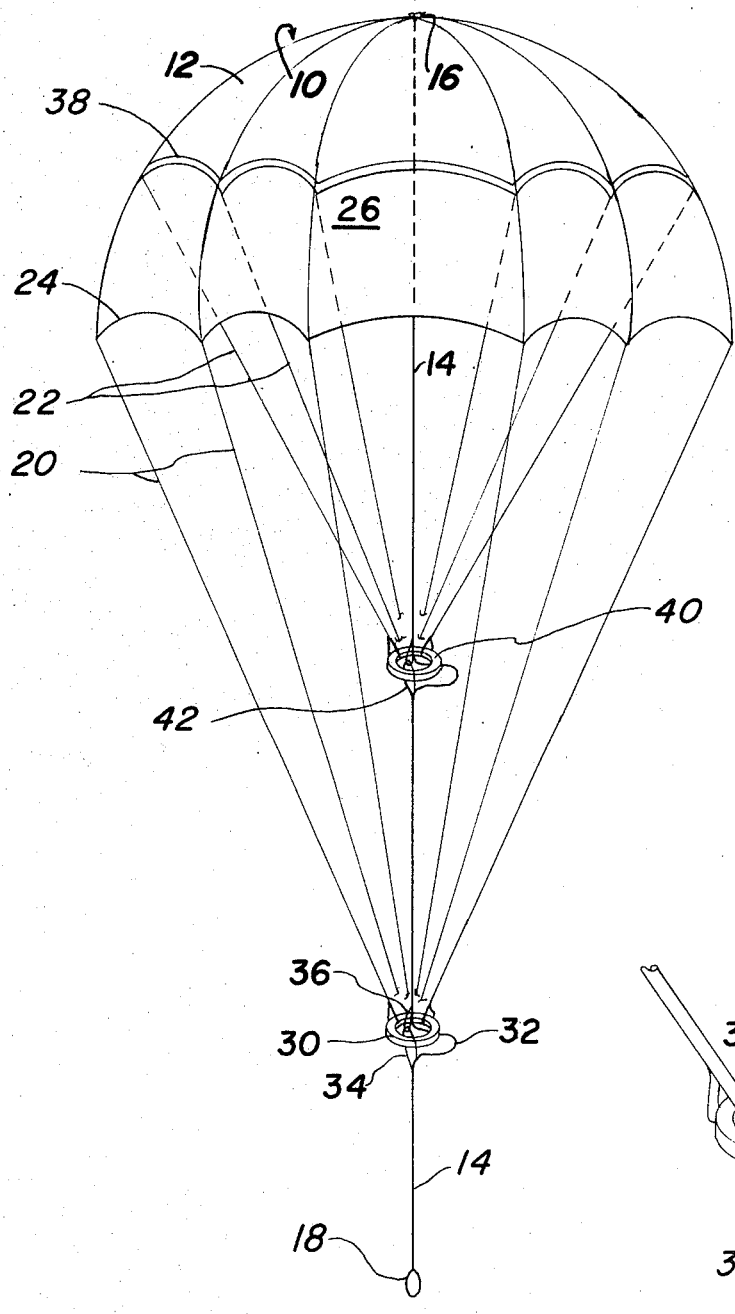
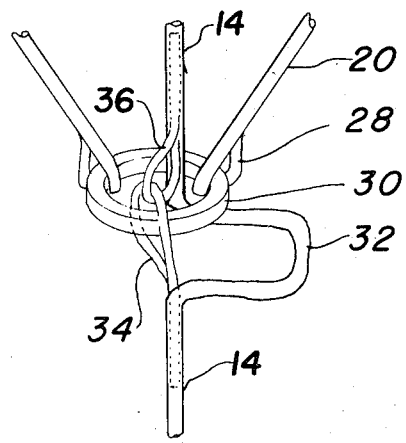
FIG. 1
FIG. 2
INVENTOR.
JON T. MATSUO
BY LAWRENCE E. NEIPLING

INVENTOR.
JON T. MATSUO
LAWRENCE E. NEIPLING
BY

CONTROLLED MULTI-STAGE DECREASING DRAG PARACHUTE

BACKGROUND OF THE INVENTION

This invention relates to parachute construction, being designed primarily for a multi-stage pilot or drogue-type parachute, but it is to be understood that it can be used for any purposes for which it is found applicable. The use of two or more parachutes having canopies of varying diameters connected in tandem for deploying a main parachute is well known in the art as illustrated, for example, by U. S. Pat. No. 3,055,621 issued Sept. 25, 1962.

Since the pilot chute is first to be deployed it must be designed so that it will develop sufficient drag force to deploy the remaining parachutes. However, if the pilot chute is overdimensioned, or ejected at a higher speed than designed, excessive drag forces may rupture the pilot canopy and/or place dangerous stresses on the entire depending parachute system.

U. S. Pat. No. 2,970,795 issued Feb. 7, 1961 discloses a bi-area pilot chute designed to meet the aforementioned problem. This chute is constructed to provide a large projected cloth area, and therefore a large drag force at low ejection velocities, and a smaller projected cloth area, and therefor a smaller drag force at higher ejection velocities. This dual result is achieved by providing two sets of suspension lines attached to concentric points about the canopy, the innermost set connected to the load and the outer set connected to the load through a break-cord. When drag forces exceed the designed strength of the break-cord, the outermost suspension lines are released along with a corresponding annular hem portion of the cloth canopy to effectively reduce the projected drag area of the cloth canopy. The broken suspension lines and canopy hem are free to flutter in a trailing condition behind the descending chute.

While the patented bi-area pilot chute meets the Navy's operational requirements for higher bail-out speeds this particular design presents several disadvantages. Firstly, drag control is limited only to the outer peripheral drag surface of the cloth canopy with the central portion of the canopy remaining inflated and uncontrolled. Secondly, the fluttering trailing cut suspension lines and canopy hem present a hazard to both equipment and personnel in that they are free to entangle and damage other lines and cloth areas by whip lashing.

SUMMARY OF THE INVENTION

An improved multi-stage, decreasing drag parachute is achieved by controlling the drag on the entire cloth canopy as well as the suspension lines. The cloth canopy is provided with a vertical centerline connecting the apex to the load to carry the main force thereof. One or more sets of suspension lines may be employed to provide additional stages of cloth canopy inflation, the lines in each set being attached at their upper ends to selected points around the canopy. The lower ends of the lines in each set are connected to a separate restraining means slidably mounted about the centerline. Each restraining means is releasable upon the application of a predetermined force to release the corresponding suspension lines and associated canopy portion to effect a corresponding reduction in the drag area of the parachute. Where a plurality of restraining means are utilized it is preferred that each be designed with a different breaking strength to produce a sequential operation of drag reduction.

OBJECTS OF THE INVENTION

An important object of this invention is to provide an improved multi-stage parachute having control over the entire drag area of the canopy to enable safe use at higher ejection speeds.

Another important object is to provide a parachute design in which any number of drag producing stages can be incorporated in a single canopy to satisfy a wide range of operational requirements.

Still another important object is to provide a multi-stage drag parachute which when deployed is less likely to damage equipment and/or personnel.

Other objects, advantages and novel features of the invention will become apparent from the following detailed description of the invention when considered in conjunction with the accompanying drawings.

BRIEF DESCRIPTION OF THE DRAWINGS

FIG. 1 is an elevation view of a novel three-stage parachute, shown extended, such as would appear when initially inflated, the canopy being in the first stage of deployment.

FIG. 2 is an enlarged elevation view of the representative means for restraining the lower end of the suspension lines in one set to the centerline.

DESCRIPTION OF THE PREFERRED EMBODIMENT

Figures 3, 4:
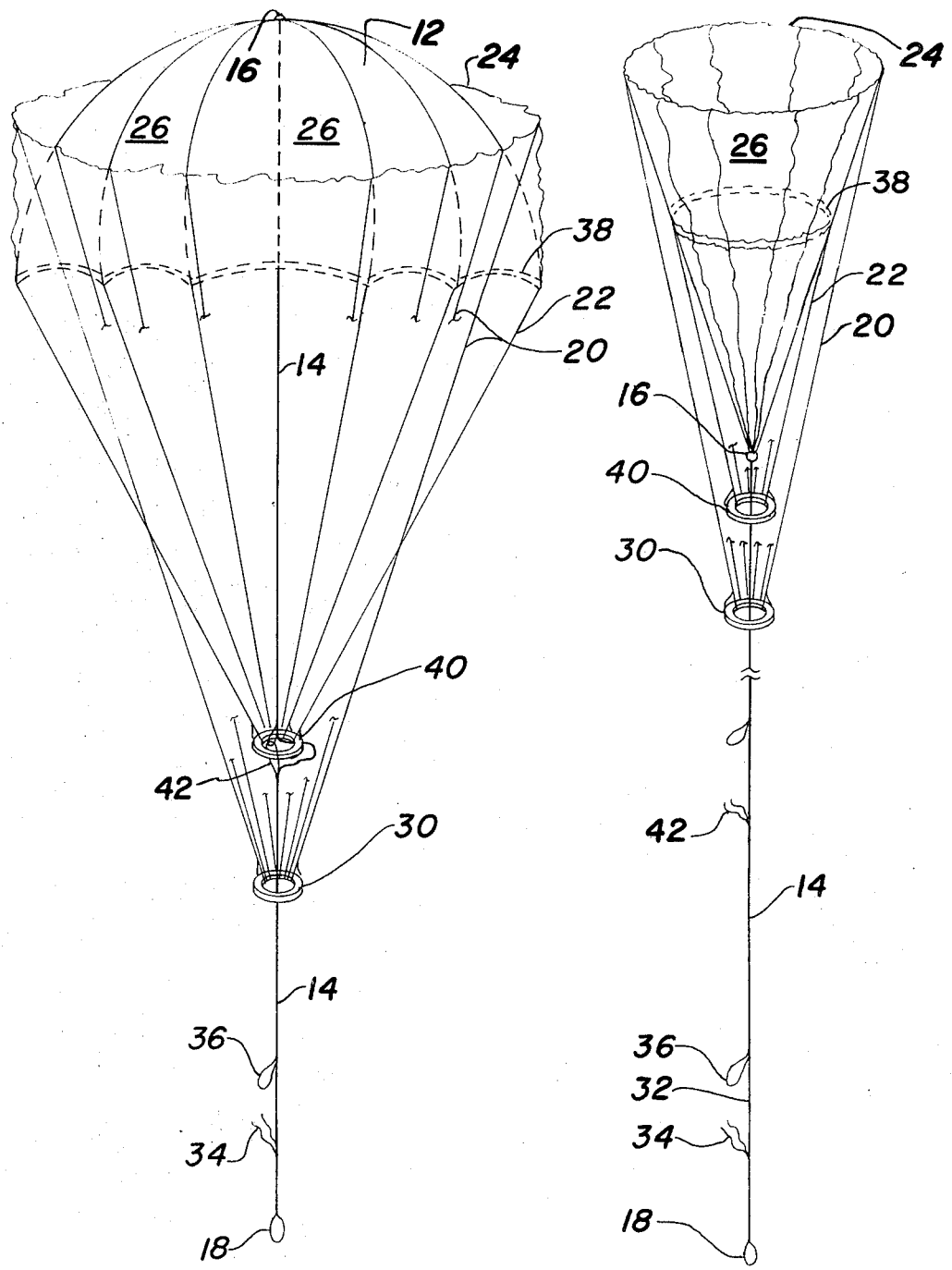
FIG. 3 is an elevation view of the parachute similar to FIG. 2 but showing the canopy in the second stage of deployment.
FIG. 4 is an elevation view of the parachute similar to FIG. 3 but showing the canopy in the third and last stage of deployment.

Referring to the drawings where like reference numerals refer to similar parts throughout the figures, there is shown in FIG. 1 the novel parachute 10 which for purposes of illustration only, is a three-stage drag area parachute. It should be understood that the number of stages incorporated in the parachute will vary depending on the operational requirements. This particular parachute is designed to handle ejection speeds from zero to 600 knots.

Parachute 10 comprises a gore-type canopy 12 having a centerline 14 attached at its upper end to the canopy apex 16 and extending vertically downward to terminate in a loop 18 to which is attached a load, such as the apex of a drogue parachute or a main parachute or other type of load, none of which are illustrated.

The three-stage parachute illustrated utilizes two sets of suspension lines 20 and 22. Set 20 is outermost, with the upper ends of the respective suspension lines attached to the canopy hem 24 at the junction of adjacent gores 26 around the entire periphery. As best illustrated in FIG. 2, the lower ends of the suspension lines in set 20 are anchored by loops 28 to a ring 30 through which centerline 14 is freely threaded. Ring 30 serves as a means for anchoring and slidably restraining the lower ends of the suspension lines to the centerline for a purpose to be described.

Some means must be provided for transferring the load from the centerline to the set of suspension lines 20. This is accomplished in the illustrated embodiment by providing a bight 32 in the centerline adjacent ring 30 and by releasably bridging the bight by a pair of interconnected loops 34 and 36. Loop 34 is fabricated of a break-cord looped around ring 30 with the ends secured to the lower side of bight 32 by means of a chinese finger supplemented by sewing. Upper loop 36 is connected to loop 34 with its ends similarly secured to the upper end of bight 32. Break-cord 34 is designed to break by the application of a predetermined force to relieve the load from suspension 20 as well as the corresponding canopy portion.

Suspension line set 22 is arranged innermost to centerline 14, with the upper ends of the lines secured to adjacent gores through a reinforcement band 38 positioned around the canopy periphery intermediate hem 24 and apex 16, the precise location depending on the desired drag force required for the particular parachute application, and other factors such as airspeed and altitude of deployment. The lower ends of suspension lines 22 are restrained about centerline 14 by a ring 40 which may be identical to ring 30 in FIG. 2 and similarly configured. The only difference is that break-cord 42 may be designed to have a higher breaking strength so that separation will occur after operation of break cord 34. Although the attachment points of the suspension lines in each set to the cloth canopy portion are shown to be concentric the particular disposition will depend on the drag requirements needed for any specific chute application.

OPERATION

The operation of the novel multi-stage parachute is apparent from the drawing. FIG. 1 illustrates the novel parachute in the first stage of deployment, such as it appears when fully inflated after initial deployment. In this condition, the canopy presents the maximum projected area which will produce the maximum drag to the load. The load in centerline 14 is being transmitted to the suspension lines of sets 20 and 22 through the respective break cords 34 and 42, respectively. Should the drag force on the canopy for any reason exceed the predetermined strength of break-cord 34, to protect canopy 12 and the entire depending parachute system, break-cord 34 is designed to break to release restraining ring 30 and the associated suspension lines 20. Ring 30 is free to ride up centerline 14 permitting the relaxation of suspension lines 20 and the release of parachute hem 24 which components assume the position in FIG. 3. Separation of break-cord 34 releases bight 32 which transmits the full load up to break-cord 42, and the parachute is ready for the second operational phase should it occur.

If the load on the remaining inflated portion of canopy exceed the designed strength of break-cord 42, it also breaks releasing associated suspension lines 22 and ring 40, and together with restraining ring 30 and lines 20 the entire assembly of parts ride up centerline 14. The canopy now assumes a minimal projected area, frequently referred to as a "flag drag" force producing area, shown in FIG. 4 being the third and last operational phase of the parachute.

Thus it can be seen that the invention parachute provides complete control over the drag surface from the maximum drag area shown in FIG. 1 to the minimum drag area as shown in FIG. 4. This should enable the invention chute to be operable over a wider range of operational factors, i.e., ejection speeds, altitude, etc. In the second and third phases of parachute deployment (FIGS. 3 and 4) the repositioned suspension lines are under control at all times eliminating any likelihood of fowling or damage through whipping.

Obviously many modifications and variations of the present invention are possible in the light of the above teachings. It is therefore to be understood that within the scope of the appended claims the invention may be practiced otherwise than as specifically described.

What is claimed is:

1. A controlled multi-stage decreasing drag parachute comprising:

a canopy having a continuous surface;

a vertical centerline connected at its upper end to the canopy apex and adapted at its lower end to be connected to a load;

at least one set of suspension lines connected at their upper ends to spaced points about the canopy;

means for restraining the lower ends of said suspension lines slidably about said centerline;

means for transferring at least a portion of the load from the centerline to the suspension lines through said restraining means;

said second named means being separable upon the application of a predetermined force to unload the corresponding suspension lines and allow its restraining means to ride up the centerline toward the canopy apex to reduce the drag exerted by the canopy, the lower ends of the unloaded suspension lines being restrained from uncontrolled flailing about by said first mentioned means.

2. The parachute of claim 1 wherein:

said restraining means is a ring-like member encircling said centerline;

said centerline being provided with a bight portion adjacent said ring-like member; and said second same means being a break-cord connecting said ring-shaped member to the centerline to maintain said bight.

3. A controlled multi-stage decreasing drag parachute comprising:

a canopy having a continuous surface;

a single vertical centerline connected at its upper end to the canopy apex and adapted to be connected at its lower end to a load;

a first set of suspension lines connected at their upper ends to the canopy at spaced points thereabout the hem of the canopy to form one canopy increment;

a second set of suspension lines connected at their upper ends to the canopy at spaced points about its periphery intermediate the hem and the canopy apex to form another canopy increment;

a first and second means for restraining the lower ends of the respective suspension lines of each set slidably about said centerline at spaced vertical positions;

a first and second releasable means for connecting said respective restraining means to the centerline for transferring at least a portion of the load to the respective suspension lines;

said first and second releasable means each being separable upon the application of a predetermined force to unload the respective suspension line set and allow the corresponding restraining means to ride up the centerline to reduce the canopy drag force on the respective canopy increment.

4. The parachute of claim 3 wherein said first named releasable means requires a smaller predetermined separation force than the second named releasable means to enable the sequential decrease in the parachute drag area.

5. The parachute of claim 3 wherein said second named restraining means is positioned closer to the canopy apex than the first named restraining means.

6. The parachute of claim 3 wherein said restraining means are ring-shaped members slidably encircling the centerline.

7. The parachute of claim 6 wherein said centerline is provided with a bight portion adjacent each of said ring-shaped members, and each of said releasable means comprises a pair of interconnected loops connected to the ends of the centerline adjacent the bight, one loop being connected to the respective ring-shaped member.

8. The parachute of claim 7 wherein said loop connected to the respective ring-shaped members is a break-cord designed to part upon the application of a predetermined force.

* * * * *